A. MACBETH.
RESERVOIR FOR LIQUID FUEL.
APPLICATION FILED NOV. 5, 1918.
1,406,667.                                    Patented Feb. 14, 1922.
Fig. 1.      Fig. 2.      Fig. 3.      Fig. 4.
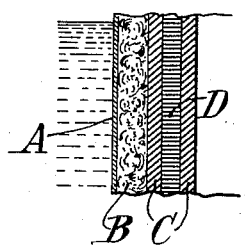 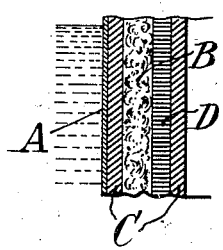 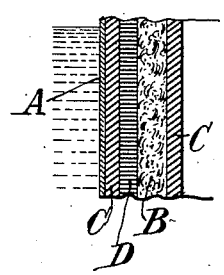 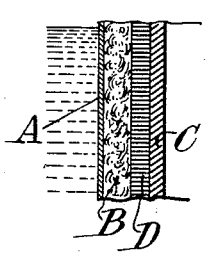
Fig. 5.      Fig. 6.
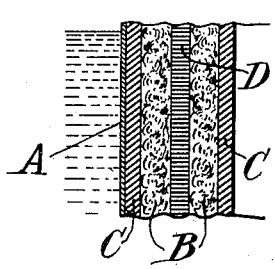 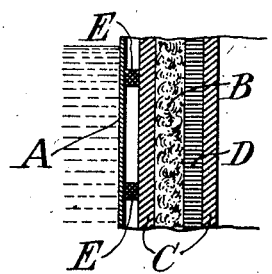
WITNESS:
INVENTOR
Allan Macbeth
By Attorneys, ns
UNITED STATES PATENT OFFICE.

ALLAN MACBETH, OF PARIS, FRANCE, ASSIGNOR TO STÉ THE DUNLOP RUBBER CY. LIMITED, OF PARIS, SEINE, FRANCE.

RESERVOIR FOR LIQUID FUEL.

1,406,667.     Specification of Letters Patent.     Patented Feb. 14, 1922.

Application filed November 5, 1918. Serial No. 261,309.

*To all whom it may concern:*

Be it known that I, ALLAN MACBETH, a subject of the King of Great Britain, residing in Paris, France, have invented certain new and useful Improvements in or relating to Reservoirs for Liquid Fuel, of which the following is a specification.

The present invention has for its object an improvement in the structure described in application Serial No. 251,004, filed August 22, 1918, in the name of the applicant.

It consists broadly in covering the metal tank externally with a covering having a layer of raw natural rubber or non-vulcanizable caoutchouc, which, in case of leakage dissolves in contact with the petrol and forms a soft substance capable of automatically stopping up the perforation, and a layer or layers of sponge rubber which absorbs the leaking petrol and reduces the volume of flow of the leak so that the non-vulcanizable rubber will dissolve and seal the perforation before any appreciable amount of petrol can escape.

Referring to the drawings,—

Figures 1 to 4 are cross-sectional views of a section of the reservoir and the layers of material.

Fig. 5 is a cross-sectional view of a section of the reservoir showing two layers of rubber sponge.

Fig. 6 is a cross-sectional view of a section of the reservoir showing the combination of layers of material and abutments.

A represents the wall or metallic partition of the reservoir. B is a layer of rubber sponge. C C are layers of vulcanized rubber, or vulcanized rubber frabric. D is a layer of non-vulcanized rubber. E are abutments.

The various layers of material are superimposed upon one another in various combinations and applied to the reservoir to render it immune from puncture.

In case of perforation, the petrol commences to flow, the leakage is absorbed by the layer of sponge rubber and gradually will leak through into contact with the non-vulcanized rubber D which will soften and spread out between the two sheets of fabric C, C, and automatically seal the perforation. Thus the leakage is reduced to a minimum and very little, if any, petrol escapes from the reservoir.

According to the present improvement the layer of rubber sponge is interposed either between the metal body and the first layer of rubber, or between the two adjacent layers. The layer of rubber sponge will be rather thicker than the other layers and will, because of its very low density, permit the weight of the protection to be considerably reduced.

It is understood that, while I have shown and described certain forms of the invention, I do not wish to be limited thereto, as various changes may be made therein without departing from the spirit of the invention.

Claims:

1. A reservoir for liquid fuel comprising a layer or rubber sponge and a layer of rubber.

2. A reservoir for liquid fuel comprising a layer of rubber sponge and a layer of non-vulcanized rubber.

3. A reservoir for liquid fuel comprising a layer of rubber sponge, a layer of non-vulcanized rubber, and a layer of vulcanized rubber.

4. A reservoir for liquid fuel comprising a layer of rubber sponge and successive layers of vulcanized rubber, non-vulcanized rubber, and vulcanized rubber.

5. A reservoir for liquid fuel comprising a wall, a layer of rubber sponge, and a layer of rubber.

6. A reservoir for liquid fuel comprising a layer of rubber sponge, a layer of vulcanized rubber, and an interposed layer of non-vulcanized rubber.

7. A reservoir for liquid fuel comprising a wall, a layer of rubber, and an interposed layer of rubber sponge.

8. A reservoir for liquid fuel comprising a wall, a layer of rubber sponge, and external layers of vulcanized and non-vulcanized rubber.

9. A reservoir for liquid fuel comprising a wall, a layer of rubber sponge, and successive layers of rubber, including a layer of non-vulcanized rubber confined between two layers of vulcanized rubber.

10. A reservoir for liquid fuel comprising a wall, a layer of vulcanized rubber, a layer of non-vulcanized rubber between said layer and the wall, and a layer of rubber sponge between said last-named layer of rubber and the wall.

In witness whereof I have hereunto signed my name.

ALLAN MACBETH.